UNITED STATES PATENT OFFICE.

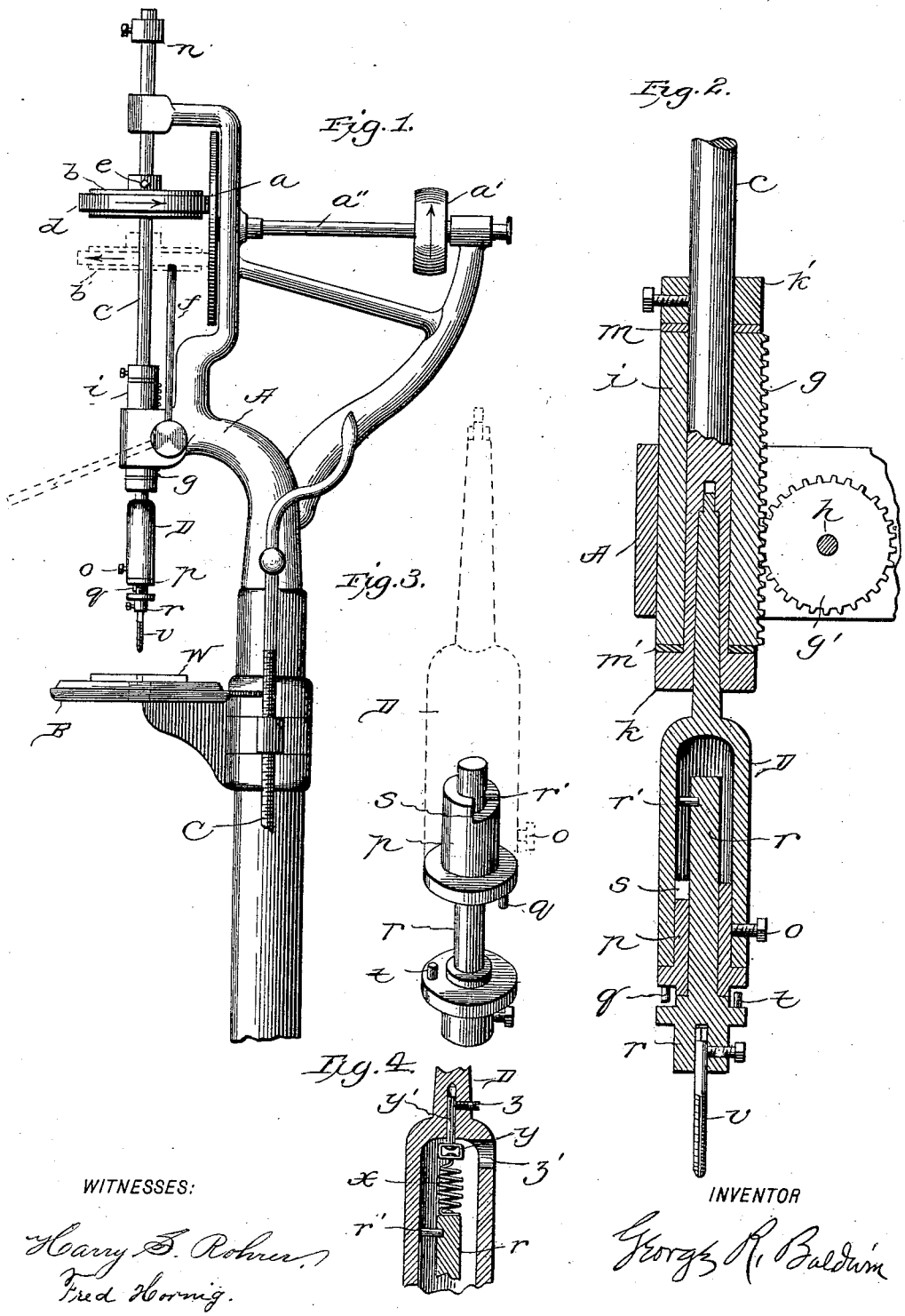

GEORGE R. BALDWIN, OF WASHINGTON, DISTRICT OF COLUMBIA.

TAPPING-MACHINE.

SPECIFICATION forming part of Letters Patent No. 583,883, dated June 8, 1897.

Application filed March 2, 1896. Serial No. 581,477. (No model.)

*To all whom it may concern:*

Be it known that I, GEORGE R. BALDWIN, a citizen of the United States, residing at Washington, in the District of Columbia, have invented certain new and useful Improvements in Tapping-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of apparatus for cutting screw-threads in holes by means of taps or on bolts or pins by means of dies. It can do either work with equal facility, but since it will more commonly be used for tapping it will be described and designated herein as a "tapping-machine." It is, however, understood that the use of dies in place of taps makes thereby the machine a bolt-cutter and also that special work-holders may be provided for special work. In tapping or screw-threading a hole it is necessary to give a forward helical motion to the tap, corresponding to the helix of the screw-thread, and afterward a reverse helical motion to withdraw the tap from the thread which has just been cut; and to accomplish this operation easily and quickly I have invented and designed the tapping-machine which is described in the following specification and drawings, in which—

Figure 1 is a view in elevation of my machine. Fig. 2 is a sectional view of the clutch-and-rack movement. Fig. 3 is a perspective view of the clutch mechanism, and Fig. 4 a detail of the clutch.

A represents the frame of the machine. Revolving on this frame is a face-wheel $a$, driven by a pulley $a'$ and a shaft $a''$. Against the face-wheel presses a friction-wheel $b$, adjustably fixed to the driven spindle $c$ by means of the set-screw $e$. The friction-wheel is provided with a ring of leather $d$, to furnish the requisite friction between the two wheels $a$ and $b$. The spindle $c$ is moved longitudinally in the frame by means of rack $g$ and pinion $g'$ (see Fig. 2) and handle $f$, the handle being connected to the pinion by shaft $h$. The rack is cut on the sleeve $i$, which encircles the lower end of the spindle $c$, and is kept from longitudinal movement relative to the spindle by the flange $k$ and fixed collar $k'$. It will thus be seen that the spindle revolves in the sleeve $i$ and is moved axially or longitudinally by the same sleeve.

$m$ and $m'$ are loose washers to reduce friction between the sleeve and spindle.

$n$ is an adjustable stop on spindle $c$, the use of which will be explained hereinafter.

Fixed in the taper-socket of spindle $c$ is a clutch-holder D, holding the two clutch members $p$ and $r$, one clutch member $p$ being a sleeve fixed to D by set-screw $o$ and the other member a tool-holder $r$, revolving and sliding in sleeve $p$. This sleeve is provided on each end with projections. On one end is shown a shoulder projection $s$ (see Fig. 3) and on the other end a pin projection $q$. The tool-holder $r$ is provided with a pin $r'$ to engage the shoulder $s$ and another pin $t$ to engage the pin $q$. The tool-holder holds, fixed by suitable means, the tap $v$. A work-table B is adjustable on the frame by means of the screw C and has a hole for the tap to run into after passing through the work. Work W is shown on the table drilled and in position for tapping.

Fig. 4 shows a spring mechanism for holding up the tool-holder and tap in order to give more clearance between tap and work. In this figure D is the clutch-holder, $r$ the tool-holder, and $x$ the tension-spring attached to $r$ and to a swivel $y$ to allow free rotation between D and $r$.

$y'$ is a pin revolubly attached to the swivel and held fixed to D by a set-screw $z$.

$z'$ is a hole in D through which the swivel mechanism can be set in position.

$b'$ shows in dotted lines the position of the friction-wheel below the center of the face-wheel when the handle is brought to its lower position.

The operation of the invention is as follows: A right-handed screw-thread is supposed to be cut. Should a left-handed thread be wanted, the proper left-handed tap must be used and the direction of the rotation of pulley $a'$ be reversed. The machine is first properly set by placing the handle $f$ in its uppermost position, setting the friction-wheel $b$ above the center of face-wheel $a$ and bringing the work on the table to such a height that the tap held up by the spring $x$ and clutched by the pins $q$ and $t$ when brought down enters the work just after the friction-wheel passes the center of the face-wheel and has reversed its (the tap's) rotation from a left-handed rotation (see arrows on Fig. 1) to a right-handed one. The tap is then driven downward into the work by the handle until the adjustable stop $n$ strikes the frame and prevents further longitudinal movement of the spindle, when the tap continues to feed itself into the work until the pin $q$ is free to pass the pin $t$ and the sleeve revolves freely on the tool-holder $r$, leaving the latter stationary. The handle is then lifted, carrying with it the friction-wheel beyond the center of the face-wheel, reversing the friction-wheel's rotation, and then bringing into contact the shoulder $s$ with pin $r'$, thus reversing the rotation of tap and withdrawing it from the thread which it has just cut. Should the spring $x$ not be used, the work will have the same position, but the tap having dropped to its lowest position will strike the work without being driven into it until the pin $q$ is brought down to clutch the pin $t$. The adjustable stop $n$ may be set so that a screw-thread of any particular depth can be cut. It is evident that it is unnecessary for the friction-wheel to pass the exact center of the face-wheel to secure a reversal in its rotation, but a line drawn through the center of the face-wheel and perpendicular to the friction-wheel spindle is a mark across which a change in the rotation of the friction-wheel takes place.

I am aware that many variations can be made in this mechanism without departing from the spirit of my invention.

The sleeve $p$ may be made an integral part of the spindle or the clutch-holder instead of being detachably fixed thereto, and friction or other releasing or clutching devices may be employed instead of the pins and shoulder projection shown in this specification. The position of the clutch members, called herein "sleeve" and "tool-holder," may be reversed, the sleeve becoming the loose clutch member holding the tap and the member $r$ fixed to the spindle, but these variations and others unnecessary to mention perform the same functions as those shown herein and come within the scope of my invention.

Having therefore described my invention, what I claim as new, and desire to protect by Letters Patent, is—

1. In a tapping-machine, the combination of a spindle, a tool-holder loosely held to said spindle, means for giving longitudinal movement to said spindle, a double releasing-clutch fixed to said spindle and operating to drive tool-holder by said spindle when sufficient forward or backward longitudinal motion is given to said spindle, a reversing and variable-speed gear, consisting of a revolving face-wheel and a friction-wheel driven by said face-wheel, said friction-wheel fixed to said spindle and movable across the face of said face-wheel, all operating to drive the tool-holder forward with an accelerated rotative speed, to release said tool-holder from further motion and then to give a backward accelerated rotation to the said tool-holder, substantially as described.

2. In a tapping-machine, the combination of a screw-threading tool held normally loose by a revolving spindle, means for moving longitudinally said spindle and means for clutching said tool-holder when said longitudinal movement is performed in either direction, a rotation-reversing and variable-speed mechanism consisting of a friction-wheel fixed to and movable with said spindle, a revolving face-wheel across the face of which the friction-wheel passes to secure its variable speed and reversal of rotation, all operating to drive the tool into the work with accelerated speed, to release the tool and then to withdraw the tool also with accelerated speed, substantially as described.

3. In a tapping-machine, means for securing a longitudinal motion to a spindle and thereby at the same time a reversal of rotation and a variable rotative speed, consisting of a revolving face-wheel, a friction-wheel pressing against and movable longitudinally on its own axis across the face of said face-wheel, a spindle fixed to said friction-wheel and a rack-and-pinion movement, in combination with a clutch member fixed to said spindle, said clutch member having clutching devices at each end, a tool-holder loosely held by said clutch member having clutching devices to engage one or the other of the clutching devices on the said clutch member when sufficient longitudinal movement in one direction or the other is given to the said clutch member, and a threading-tool fixed to said tool-holder, all operating substantially as described.

4. In a tapping-machine the combination of, a revolving face-wheel, a friction-wheel pressing against, revolved by, and movable longitudinally on its own axis across the face of said face-wheel, a spindle adjustably fixed to said friction-wheel, a rack-and-pinion movement to give longitudinal movement to said spindle and friction-wheel, a double releasing-clutch fixed to said spindle and a threading-tool fixed to said clutch, operating to drive the tool into the work with accelerated speed when the spindle is pressed downward, to release the tool at a middle position and to withdraw the tool with accelerated speed when the spindle is pressed upward all operating substantially as described.

In testimony whereof I affix my signature in presence of two witnesses.

GEORGE R. BALDWIN.

Witnesses:
S. BRASHEARS, Jr.,
E. A. KEELING, Jr.